(12) United States Patent
Gilliland et al.

(10) Patent No.: US 7,209,070 B2
(45) Date of Patent: Apr. 24, 2007

(54) SYSTEM AND METHOD FOR ENHANCED SITUATIONAL AWARENESS OF TERRAIN IN A VERTICAL SITUATION DISPLAY

(75) Inventors: William R. Gilliland, Glendale, AZ (US); Troy A. Nichols, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 240 days.

(21) Appl. No.: 10/960,838

(22) Filed: Oct. 7, 2004

(65) Prior Publication Data

US 2006/0077092 A1   Apr. 13, 2006

(51) Int. Cl.
G01S 13/94 (2006.01)
G01S 13/95 (2006.01)

(52) U.S. Cl. .................. 342/26 B; 342/179; 342/191
(58) Field of Classification Search .............. 342/26 B
See application file for complete search history.

(56) References Cited

U.S. PATENT DOCUMENTS

| | | | | |
|---|---|---|---|---|
| 4,940,987 | A * | 7/1990 | Frederick | 342/26 D |
| 5,086,396 | A | 2/1992 | Waruszewski, Jr. | |
| 5,781,146 | A * | 7/1998 | Frederick | 342/26 B |
| 5,828,332 | A | 10/1998 | Frederick | |
| 5,920,276 | A * | 7/1999 | Frederick | 342/26 B |
| 5,936,552 | A | 8/1999 | Wichgers et al. | |
| 5,995,901 | A * | 11/1999 | Owen et al. | 701/202 |
| 6,154,151 | A * | 11/2000 | McElreath et al. | 340/970 |
| 6,433,729 | B1 * | 8/2002 | Staggs | 342/29 |
| 6,653,947 | B2 * | 11/2003 | Dwyer et al. | 340/970 |
| 6,690,298 | B1 | 2/2004 | Barber et al. | |
| 6,879,280 | B1 * | 4/2005 | Bull et al. | 342/26 B |
| 6,995,690 | B1 * | 2/2006 | Chen et al. | 340/974 |
| 2002/0053983 | A1 * | 5/2002 | Chamas et al. | 340/945 |
| 2005/0010359 | A1 * | 1/2005 | Qureshi | 701/205 |
| 2005/0182528 | A1 | 8/2005 | Dwyer et al. | |
| 2005/0231390 | A1 * | 10/2005 | Crane et al. | 340/945 |
| 2006/0004496 | A1 * | 1/2006 | Tucker et al. | 701/4 |
| 2006/0005147 | A1 * | 1/2006 | Hammack et al. | 715/805 |

FOREIGN PATENT DOCUMENTS

WO   WO2005/057133 A1   6/2005

OTHER PUBLICATIONS

PCT International Search Report PCT/US2005/036118, Apr. 21, 2006.

* cited by examiner

*Primary Examiner*—Thomas H. Tarcza
*Assistant Examiner*—Matthew M Barker
(74) *Attorney, Agent, or Firm*—Ingrassia Fisher & Lorenz (57) ABSTRACT

A vertical situation display ("VSD") system according to the invention generates a terrain image that represents a profile view of terrain elevation relative to the position of an aircraft traveling above the terrain. The VSD system generates the VSD image such that the terrain image is biased toward the lower elevation region of the VSD screen, thus making efficient use of the available display area. The VSD image is also generated such that it is continuous across the lateral range of the VSD, thus ensuring that terrain is shown in the VSD at all practical times, depending upon the available range and any priority display rules.

24 Claims, 6 Drawing Sheets

SYSTEM AND METHOD FOR ENHANCED SITUATIONAL AWARENESS OF TERRAIN IN A VERTICAL SITUATION DISPLAY

TECHNICAL FIELD

The present invention relates generally to avionics systems such as flight display systems. More particularly, the present invention relates to a vertical situation display.

BACKGROUND

A vertical situation display ("VSD") provides a two-dimensional representation of an aircraft, the aircraft flight plan, and terrain under the aircraft or projected aircraft track. The VSD is usually displayed in close proximity to a lateral map display, such that the vertical situation of the aircraft can be coordinated visually with the lateral situation of the aircraft. In a practical deployment, the VSD may be included in a primary flight display, a multifunction display, or other suitable display component on the aircraft. VSD systems are designed to prevent controlled flight into terrain ("CFIT") by providing a display of the terrain relative to the present altitude of the aircraft. In this regard, a member of the aircraft flight crew can obtain information related to the vertical situation of the aircraft relative to the terrain with a simple glance at the VSD.

Practical VSDs typically include a number of parameters and visual indicators that enable the pilot to form a quick mental picture of the vertical situation of the aircraft. For example, VSDs may include displays of an aircraft symbol, the aircraft altitude, the flight plan, the selected altitude, and the terrain. The physical space available to a VSD is usually limited, and the limited space should be efficiently allocated to accommodate the VSD elements.

Figure 1:
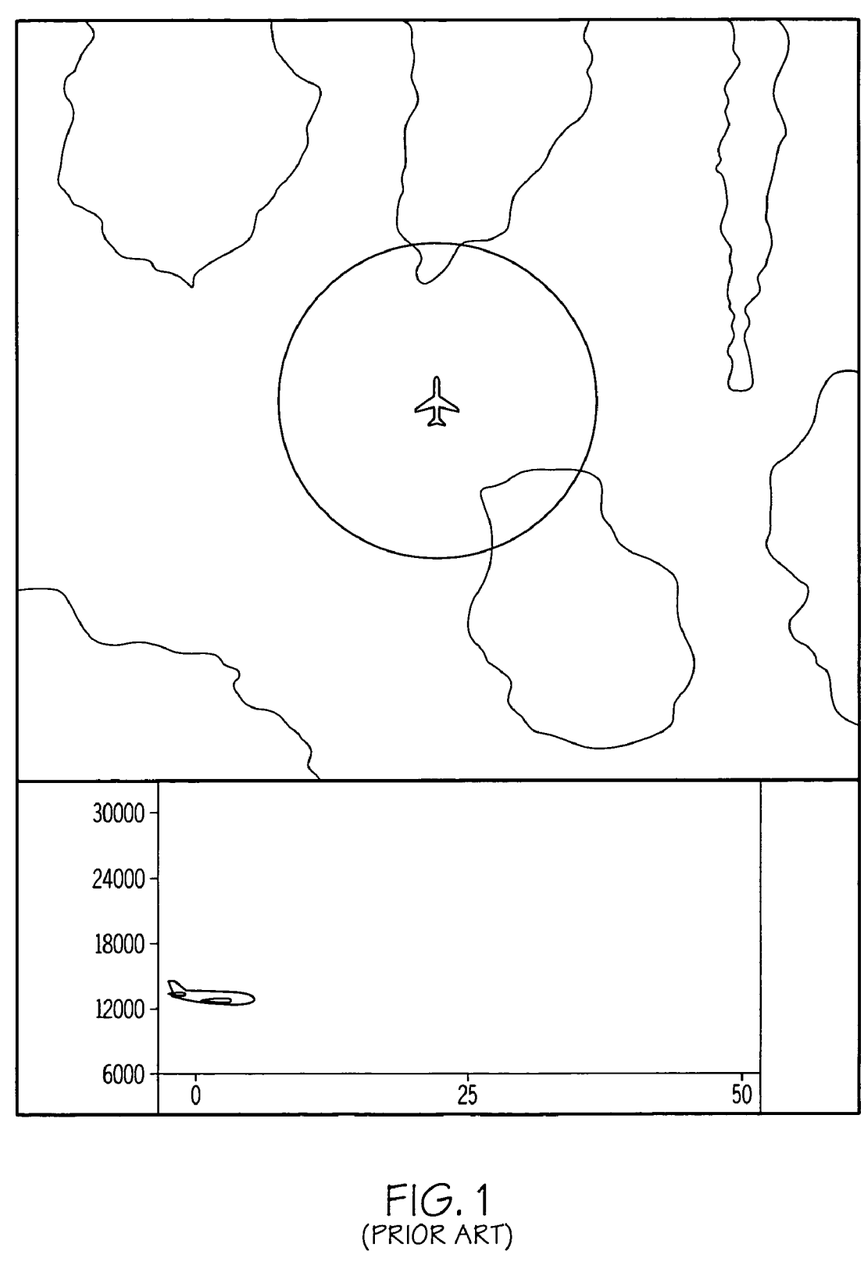
FIG. 1 is a schematic representation of a flight deck display screen with a display generated by a prior art VSD system.

Conventional VSD systems may not take full advantage of the display space allocated to the VSD. For example, at least one conventional VSD system considers only the origin and destination terrain elevations to determine the elevation of terrain displayed in the VSD. If, during flight, the altitude of the terrain under the aircraft falls below the origin/destination elevation, then the VSD will not include any terrain. When terrain is not displayed, such as in FIG. 1, it may be difficult for the pilot to form a mental picture of the vertical situation at a glance. On the other hand, when terrain 10 is displayed in a large portion of the available display 12, such as in FIG. 2, much of the vertical display range is utilized to show more terrain than is necessary to enable the pilot to form a mental picture of the current vertical situation. Furthermore, the display of excess terrain may preclude the display of other parameters or additional information of interest at the top of the VSD, such as the flight plan or the selected altitude (not shown in FIG. 2).

Accordingly, it is desirable to have a VSD system that automatically positions the terrain and/or adjusts the vertical scale of the display such that terrain is in view if practical and such that the vertical range of the VSD is efficiently utilized. Furthermore, other desirable features and characteristics of the present invention will become apparent from the subsequent detailed description and the appended claims, taken in conjunction with the accompanying drawings and the foregoing technical field and background.

BRIEF SUMMARY

A VSD system according to the invention generates the VSD image such that the terrain under the flight plan, or under the current track of the aircraft, is displayed in a manner that efficiently utilizes the physical space allocated to the VSD. In the example embodiment, the vertical centering logic of the VSD system processes an input related to the current terrain altitude within the horizontal range of the VSD. The vertical centering of the VSD and/or the terrain displayed in the VSD is adjusted in response to the input such that the VSD vertical range is not "wasted" by displaying altitudes below the terrain elevation.

The above and other aspects of the invention may be carried out in one form by a method for displaying terrain on an aircraft flight deck display system. The method involves the processing of terrain data and the displaying of a terrain image representative of the terrain data on a VSD, where the terrain image is biased toward a lower elevation region of the VSD.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of practical display devices and that the avionics system described herein is merely one exemplary application for the invention.

For the sake of brevity, conventional techniques related to image rendering, data transmission, avionics system control and communication, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 3:
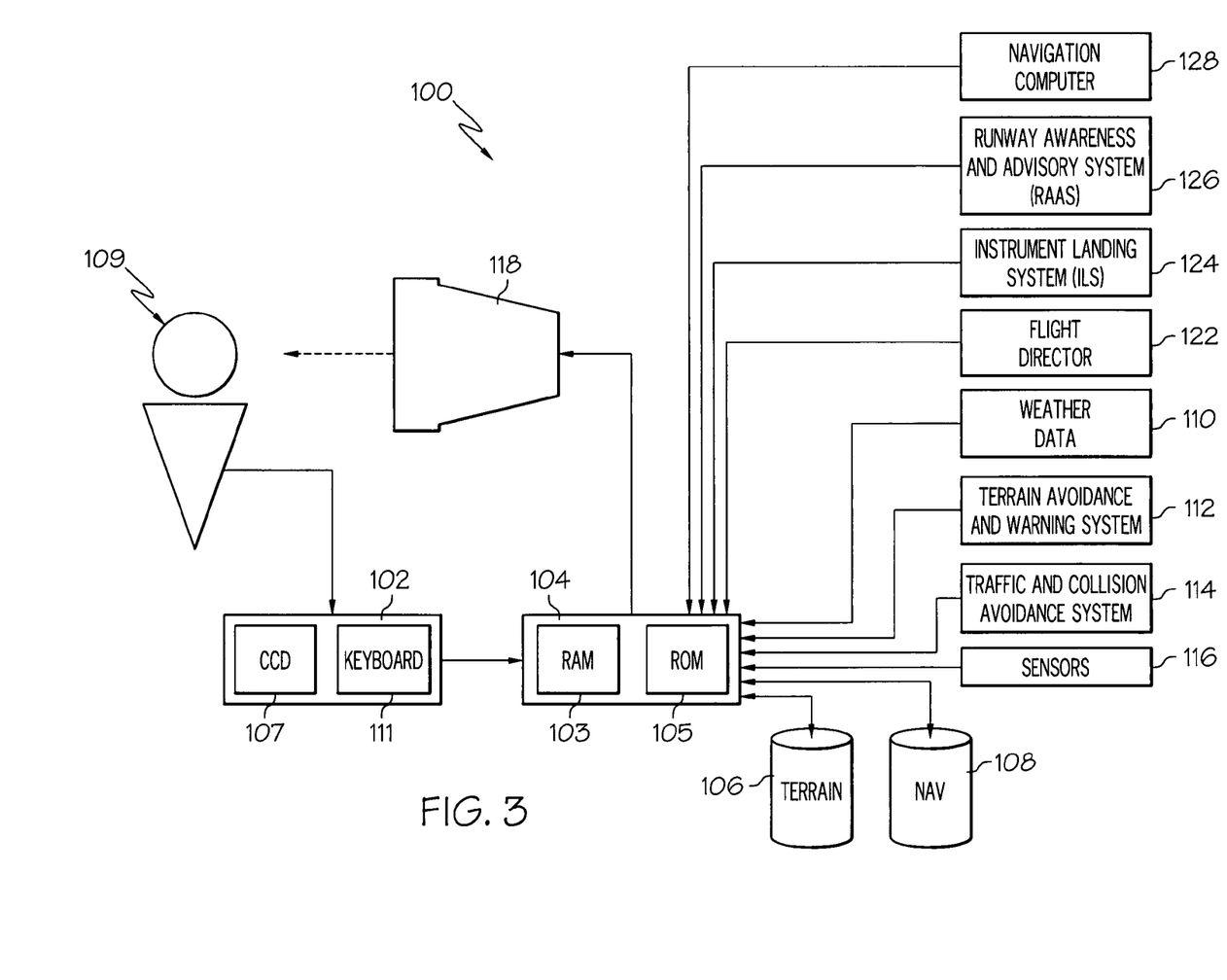
FIG. 3 is a simplified schematic representation of a flight deck display system.

Referring to FIG. 3, an example flight deck display system 100 will be described. Display system 100 includes a user interface 102, a processor 104, one or more terrain databases 106, one or more navigation databases 108, a source of weather data 110, a terrain avoidance and warning system ("TAWS") 112, a traffic and collision avoidance system ("TCAS") 114, various sensors 116, and a display device 118. User interface 102 is in operable communication with processor 104 and is configured to receive input from a user 109 (e.g., a pilot) and, in response to the user input, supply command signals to processor 104. User interface 102 may be any one, or combination, of various known user interface devices including, but not limited to, a cursor control device ("CCD") 107, such as a mouse, a trackball, or joystick, and/or a keyboard, one or more buttons, switches, or knobs. In the depicted embodiment, user interface 102 includes a CCD 107 and a keyboard 111. User 109 uses CCD 107 to, among other things, move a cursor symbol on the display screen, and may use keyboard 111 to, among other things, input textual data.

Processor 104 is in operable communication with terrain databases 106, navigation databases 108, and display device 118, and is coupled to receive various types of inertial data from sensors 116, and various other avionics-related data from one or more other external systems, which are briefly described further below. Processor 104 is suitably configured to selectively retrieve terrain data from one or more of terrain databases 106 and navigation data from one or more of navigation databases 108, and to supply appropriate display commands to display device 118, so that the retrieved terrain and navigation data (or image data associated with the retrieved terrain and navigation data) are appropriately displayed on display device 118. In this regard, processor 104 may operate in response to the inertial data. As FIG. 3 additionally shows, processor 104 is also in operable communication with the source of weather data 110, TAWS 112, and TCAS 114, and is additionally configured to supply appropriate display commands to display device 118 so that the avionics data, weather data from source 110, data from TAWS 112, data from TCAS 114, and data from the previously mentioned external systems may also be selectively processed for display on display device 118. The preferred manner in which the terrain and navigation data are processed for display on display device 118 will be described in more detail below. Before doing so, however, a brief description of processor 104, data sources 106, 108, 110, 112, and 114, and display device 118, at least in the depicted embodiment, will be provided.

Processor 104 may be any one of numerous known general-purpose microprocessors or an application specific processor that operates in response to program instructions. In the depicted embodiment, processor 104 includes on-board RAM (random access memory) 103, and on-board ROM (read only memory) 105. The program instructions that control processor 104 may be stored in either or both RAM 103 and ROM 105. For example, the operating system software may be stored in ROM 105, whereas various operating mode software routines and various operational parameters may be stored in RAM 103. It will be appreciated that this arrangement is merely an example of one suitable scheme for storing operating system software and software routines, and that various other storage schemes may be implemented. It will also be appreciated that processor 104 may be implemented using various other circuits, not just a programmable processor. For example, digital logic circuits and analog signal processing circuits could also be used.

Terrain databases 106 include various types of data representative of the terrain over which the aircraft is flying, and navigation databases 108 include various types of navigation-related data. The navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although terrain databases 106 and navigation databases 108 are, for clarity and convenience, shown as being stored separate from processor 104, all or portions of either or both of these databases 106, 108 could be loaded into the on-board RAM 103, or integrally formed as part of processor 104, and/or RAM 103, and/or ROM 105. Terrain databases 106 and navigation databases 108 could also be part of a device or system that is physically separate from display system 100.

The avionics data that is supplied from sensors 116 includes data representative of the state of the aircraft such as, for example, aircraft speed, altitude, and heading. The weather data from source 110, and supplied to processor 104, is representative of at least the location and type of various weather cells. The data supplied from TCAS 114 includes data representative of other aircraft in the vicinity, which may include, for example, speed, direction, altitude, and altitude trend. In one practical embodiment, processor 104, in response to the TCAS data, supplies appropriate display commands (or rendering data indicative of the display commands) to display device 118 such that a graphic representation of each aircraft in the vicinity is displayed on display device 118. TAWS 112 supplies data representative of the location of terrain that may be a threat to the aircraft. Processor 104, in response to the TAWS data, can supply appropriate display commands (or rendering data indicative of the display commands) to display device 118 such that the potential threat terrain is displayed in various colors depending on the level of threat. For example, red is typically used for warnings (immediate danger), yellow is typically used for cautions (possible danger), and green is typically used for terrain that is not a threat. It will be appreciated that these colors and number of threat levels are merely illustrative, and that other colors and different numbers of threat levels can be provided as a matter of choice.

As was previously alluded to, one or more other external systems (or subsystems) may also provide avionics-related data to processor 104 for display on display device 118. In the depicted embodiment, these external systems include a flight director 122, an instrument landing system ("ILS") 124, a runway awareness and advisory system ("RAAS") 126, and a navigation computer 128. Flight director 122, as is generally known, supplies command data representative of commands for piloting the aircraft in response to data entered by the flight crew, or various inertial and avionics data received from external systems. The command data supplied by flight director 122 may be supplied to processor 104 and displayed on display device 118 for use by pilot 109, or the data may be supplied to an autopilot (not illustrated). The autopilot, in turn, produces appropriate control signals which are applied to the flight control surfaces of the aircraft to cause the aircraft to fly in accordance with the data entered by the flight crew, or the inertial and avionics data.

ILS 124 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. ILS 124 on board the aircraft receives these signals and supplies appropriate data to the processor for display of, for example, an ILS feather (not illustrated in FIG. 3) on display device 118. The ILS feather represents two signals, a localizer signal that is used to provide lateral guidance, and a glide slope signal that is used for vertical guidance.

RAAS 126 provides improved situational awareness to help lower the probability of runway incursions by providing timely aural advisories to the flight crew during taxi, takeoff, final approach, landing and rollout. RAAS 126 uses GPS data to determine aircraft position and compares aircraft position to airport location data stored in navigation database 108. Based on these comparisons, RAAS 126, if necessary, issues appropriate aural advisories. For example, these aural advisories can inform pilot 109 of when the aircraft is approaching a runway—either on the ground or from the air, when the aircraft has entered and is aligned with a runway, when the runway is not long enough for the particular aircraft, the distance remaining to the end of the runway as the aircraft is landing or during a rejected takeoff, when pilot 109 inadvertently begins to take off from a taxiway, and when an aircraft has been immobile on a runway for an extended time.

Navigation computer 128 is used, among other things, to allow pilot 109 to program a flight plan from one destination to another. Navigation computer 128 may be in operable communication with flight director 122. As was mentioned above, flight director 122 may be used to automatically fly, or assist pilot 109 in flying, the programmed route. Navigation computer 128 is in operable communication with various databases including, for example, terrain database 106, and navigation database 108. Processor 104 may receive the programmed flight plan data from navigation computer 128 and cause the programmed flight plan, or at least portions thereof, to be displayed on display device 118. For example, the flight plan may be displayed on a VSD and on a lateral map, both rendered on display device 118.

Display device 118 is used to display various images and data, in both a graphical and a textual format, and to supply visual feedback to user 109 in response to the user input commands supplied by user 109 to user interface 102. Briefly, display device 118 is suitably configured to receive rendering data indicative of image rendering display commands generated by processor 104. In response to such rendering data, display device 118 renders a terrain image representative of the terrain data (and possibly other images) on the VSD. It will be appreciated that display device 118 may be any one of numerous known displays suitable for rendering image and/or text data in a format viewable by user 109. Non-limiting examples of such displays include various cathode ray tube ("CRT") displays and various flat panel displays such as liquid crystal displays and thin film transistor displays. The display may additionally be based on a panel mounted display, a HUD projection, or any known technology. In an example embodiment, display element 118 includes a panel display. To provide a more complete description of the techniques implemented by flight deck display system 100, a general description of display device 118 and its layout will now be provided.

Figure 4:
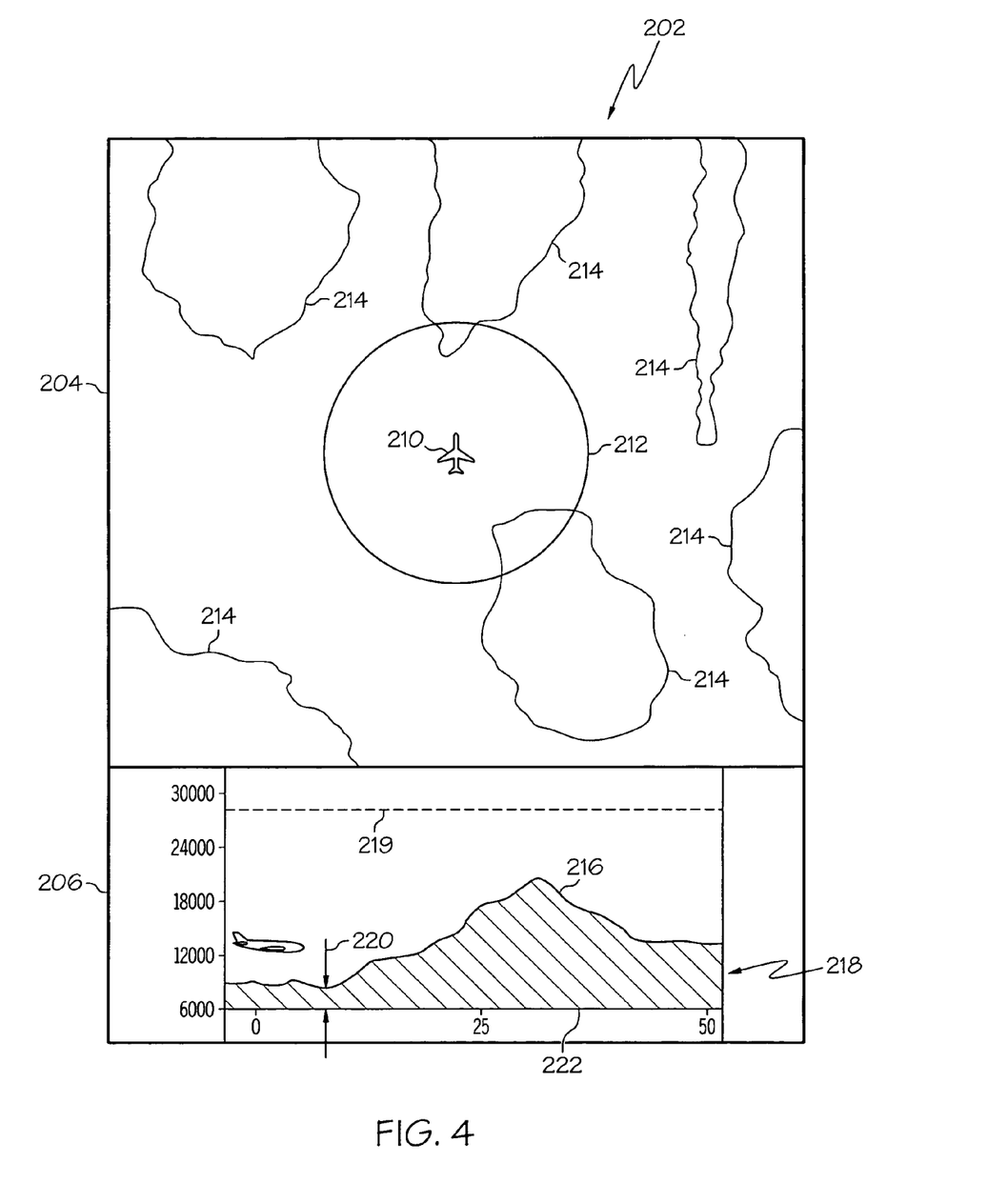
FIG. 4 is a schematic representation of a flight deck display screen with a display generated by a VSD system configured in accordance with the invention.

With reference to FIG. 4, the display device may include a display area 202 in which multiple graphical and textual images may be simultaneously displayed, preferably in different sections of display area 202. For example, a lateral situation display 204, and a VSD 206 may be displayed simultaneously, alone, or in various combinations, in various sections of display area 202. Although not depicted in FIG. 4, display area 202 may also include general flight-related data associated with the flight plan of the aircraft. Such data includes, but is not limited to, the flight identifier, route iteration number, a waypoint list and associated information, such as bearing and time to arrive, just to name a few. It will be appreciated that the general flight-related data may additionally include various types of data associated with various types of flight hazards.

Lateral situation display 204 includes a top-view aircraft symbol 210 and one or more range rings 212. Lateral situation display 204 may also depict a flight plan represented by one or more waypoint symbols and interconnecting line segments (not shown). Lateral situation display 204 may also include various map features including, but not limited to, a lateral two-dimensional view of terrain 214 below the aircraft, political boundaries, and navigation aids. It will be appreciated that for clarity only terrain 214 is shown in FIG. 4. Range rings 212, only one of which is shown in FIG. 4, indicate nautical distance from top-view aircraft symbol 210.

VSD 206 also provides a view of the terrain in the form of a terrain image 216. VSD 206 may provide terrain image 216 below the flight plan and/or ahead of the aircraft, and may render terrain image 216 and various other symbols and/or data (discussed further below) as a two-dimensional profile vertical situation view, or any suitable view. In the depicted embodiment, terrain image 216 is displayed as a profile view that depicts the elevation of the terrain relative to the aircraft. It will be appreciated that lateral situation display 204 and VSD 206 may use the same scale so that the pilot can easily orient the present aircraft position to either section of display area 202. It will additionally be appreciated that processor 104 may implement any one of numerous types of image processing and/or rendering methods to process terrain data from terrain database 106 and render the VSD terrain image 216.

Figure 2:
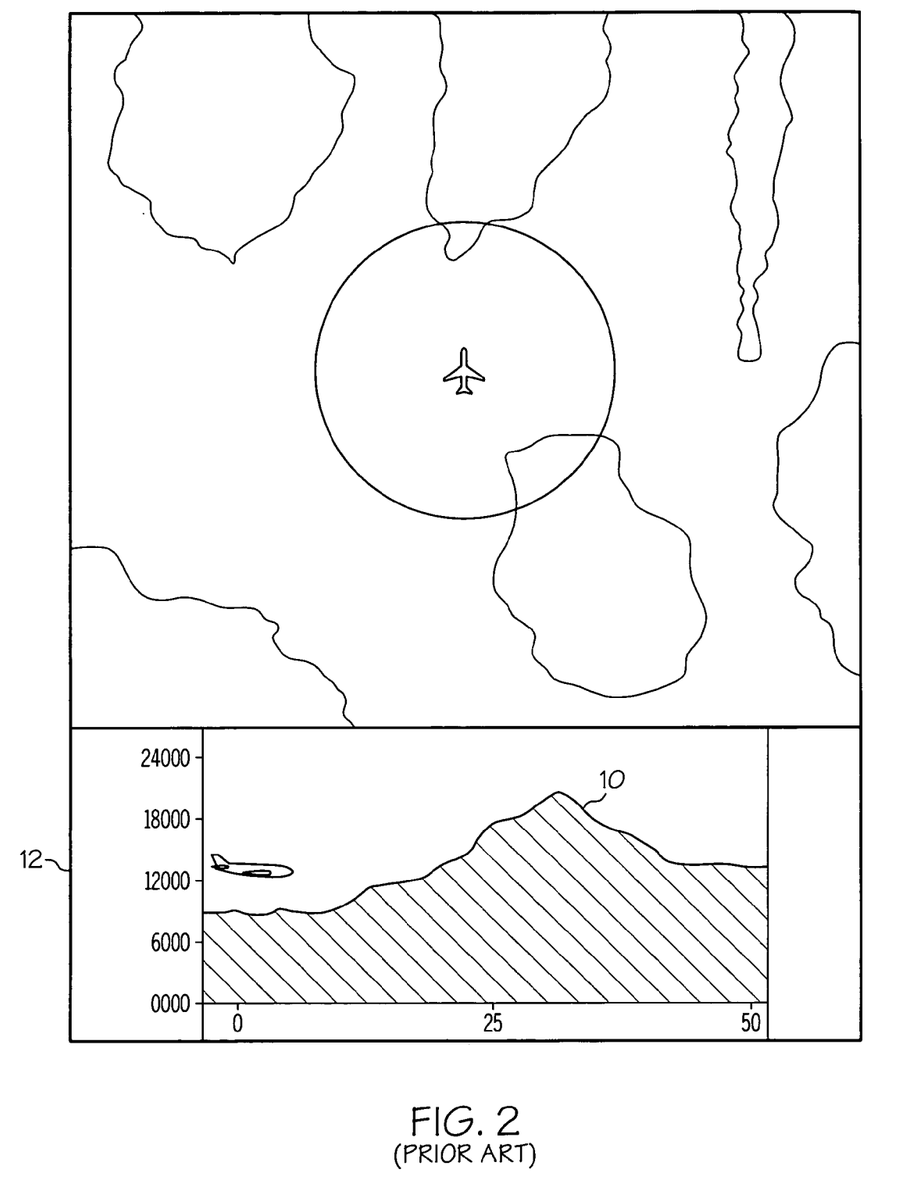
FIG. 2 is a schematic representation of a flight deck display screen with a display generated by a prior art VSD system.

In contrast to the terrain image depicted in FIG. 2, terrain image 216 is biased toward a lower elevation region 218 of VSD 206. In the illustrated example, terrain image 216 is biased toward the bottom of VSD 206 such that terrain image 216 occupies a relatively small portion of the available display area. In other words, VSD 206 is rendered to enable efficient use the display area above terrain image 216. For example, the available display area can be populated with other information (such as flight data or a selected altitude) or it can remain blank to provide a clean and uncluttered look. VSD 206 in FIG. 4 includes an element corresponding to a selected altitude 219 of 28,000 feet. In practice, selected altitude 219 may be rendered as a colored and/or dashed line on VSD 206. In contrast to the VSD shown in FIG. 1, where no terrain image is visible, terrain image 216 is rendered as a continuous image across a lateral range of VSD 206. In the example embodiment, the "lateral range" of VSD 206 spans the horizontal scale of VSD 206. In FIG. 4, the lateral range spans 0 to 50 units such as miles or kilometers. This feature is desirable to ensure that terrain is depicted at all times on VSD 206 when practical, given the display priorities and available vertical range. Alternatively, the display system may be configured to render terrain image 216 such that at least some terrain is shown within the given lateral range of VSD 206.

In practice, the display system is also suitably configured to calculate a display margin 220 for terrain image 216. In the majority of cases, the display margin 220 should define the height of the terrain in the display. When other priority display items (e.g., the flight plan or the aircraft symbol) are below the level of the terrain, the terrain may be displayed higher in VSD 206 than the display margin 220 defines. If priority items are too high, i.e., beyond the range of the display, then the vertical centering may be adjusted to show the higher priority items, at the expense of displayed terrain. Display margin 220 represents a minimum separation between terrain image 216 and a display boundary 222 of VSD 206. In the illustrated example, display boundary 222 corresponds to the lowest vertical scale value of VSD 206. During flight, the current altitude or elevation indicated by display boundary 222 may vary. Display margin 220 provides a "buffer" for VSD 206 so that the pilot can easily distinguish terrain image 216 from the bottom of VSD 206. In accordance with one practical embodiment, display margin 220 is approximately 10% of the vertical scale or physical height of VSD 206. Of course, other percentages can be utilized depending upon the needs of the given application, such as human ergonomic factors, pilot feedback, or the like.

It was noted above that flight-related data, lateral situation display 204, and VSD 206 may be displayed in various combinations. Hence, before proceeding further with the description, it should be appreciated that, for clarity and ease of explanation and depiction, in the figures contained herein only lateral situation display 204 and VSD 206 are shown as being simultaneously displayed together in display area 202 of the display device.

Figure 5:
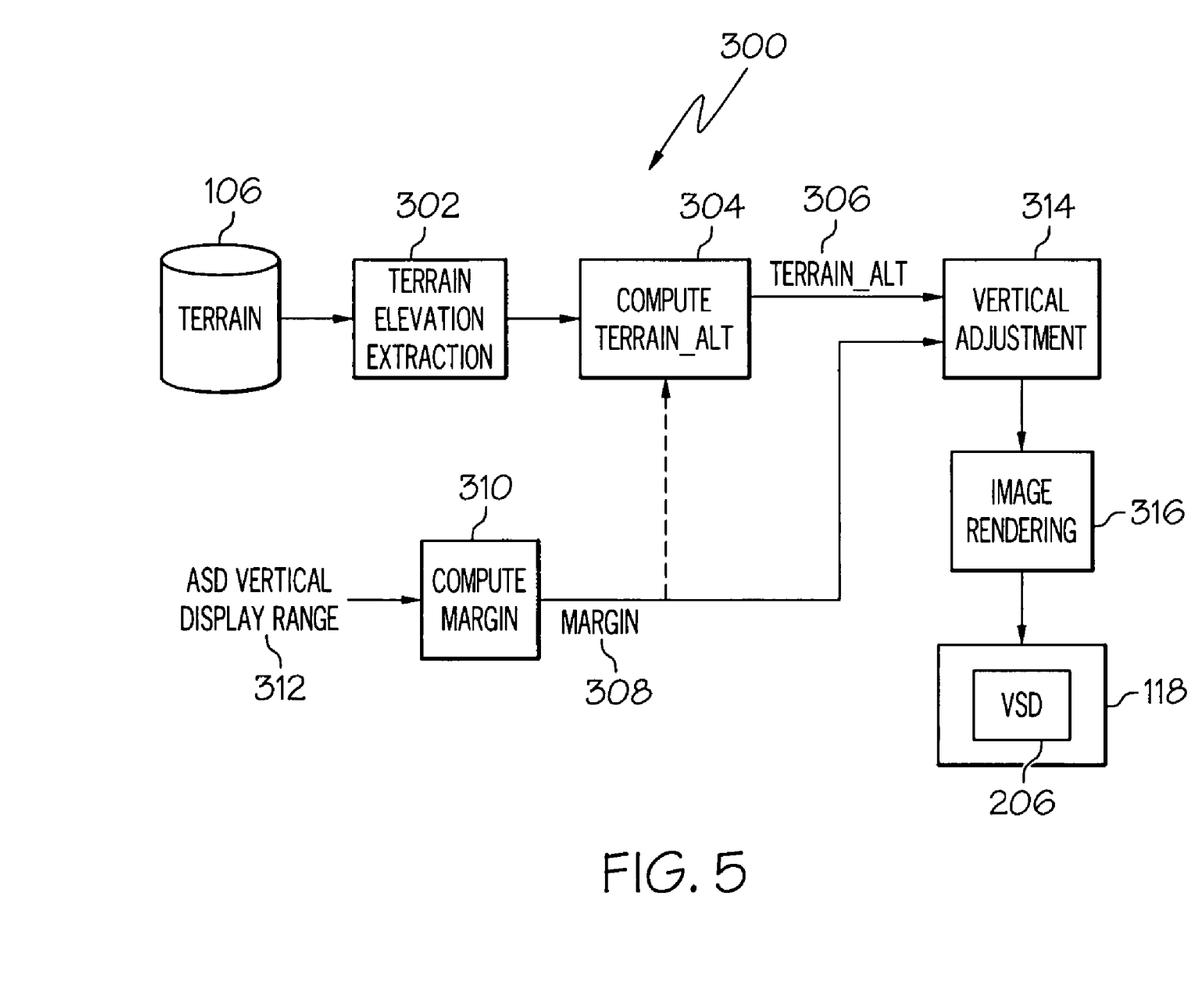
FIG. 5 is a simplified schematic representation of a flight deck display system.

Referring to FIG. 5, an example flight deck display system 300 will be described. System 300 may be realized in flight deck display system 100 (see FIG. 3). In this regard, system 300 also includes terrain database(s) 106 and display device 118 as described previously herein. In a practical deployment, the remaining functional blocks shown in FIG. 5 are realized as processing logic elements in processor 104. Briefly, these processing logic elements depict the manner in which terrain image 216 is rendered on VSD 206.

Display system 300 may include processing logic 302 configured to perform terrain elevation extraction in response to terrain data from database 106. This extraction obtains a plurality of terrain elevations corresponding to the current lateral range of VSD 206. For example, processing logic 302 may obtain an array of discrete terrain elevation values within a defined swath or width, where the overall length of the array corresponds to the horizontal range of VSD 206. The elevation values can serve as inputs to processing logic 304 configured to compute a terrain adjustment parameter ("Terrain_Alt") 306 that is utilized to adjust the vertical orientation of terrain image 216 within the VSD 206. In the example embodiment, Terrain_Alt 306 is generated in response to a minimum terrain elevation taken from the plurality of terrain elevations extracted by processing logic 302. In an alternate embodiment (represented by the dashed line in FIG. 5), Terrain_Alt 306 may also be generated in response to a display margin value 308.

Display system 300 may include processing logic 310 configured to compute display margin value 308. Processing logic 310 may generate display margin value 308 in response to a vertical display range 312 or vertical scale of VSD 206. As mentioned above, display margin value 308 can be a percentage of the vertical scale of VSD 206, e.g., 10% of the vertical scale. In one practical embodiment, processing logic 304 calculates Terrain_Alt 306 as follows: Terrain_Alt=Terrain_Elevation$_{min}$–Display_Margin, where Terrain_Elevation$_{min}$ is the minimum elevation within the current lateral range of VSD 206, and Display_Margin is display margin value 308.

Terrain_Alt 306 serves as an input to processing logic 314 configured to perform vertical adjustment of terrain image 216 within VSD 206. Processing logic 314 may also perform vertical adjustment in response to display margin value 308. Although not shown in FIG. 5, processing logic 314 may also process any number of additional inputs, parameters, or attributes. In practice, processing logic 314 may define and perform a vertical centering algorithm that determines how best to position terrain image 216 in VSD 206. This algorithm may employ a priority scheme that initially determines important parameters, data, and information to display, then adjusts the vertical center of VSD 206 to show as many other parameters, data, and information (in priority order) as possible. The algorithm ensures that terrain image 216 is biased toward the bottom of VSD 206, thus making more free display space available above terrain image 216.

Processing logic 314 may communicate with processing logic 316, which is configured to perform image rendering to facilitate display of VSD 206 on display device 118. Ultimately, terrain image 216 is rendered in response to Terrain_Alt 306 and in response to the terrain data provided by database 106.

Figure 6:
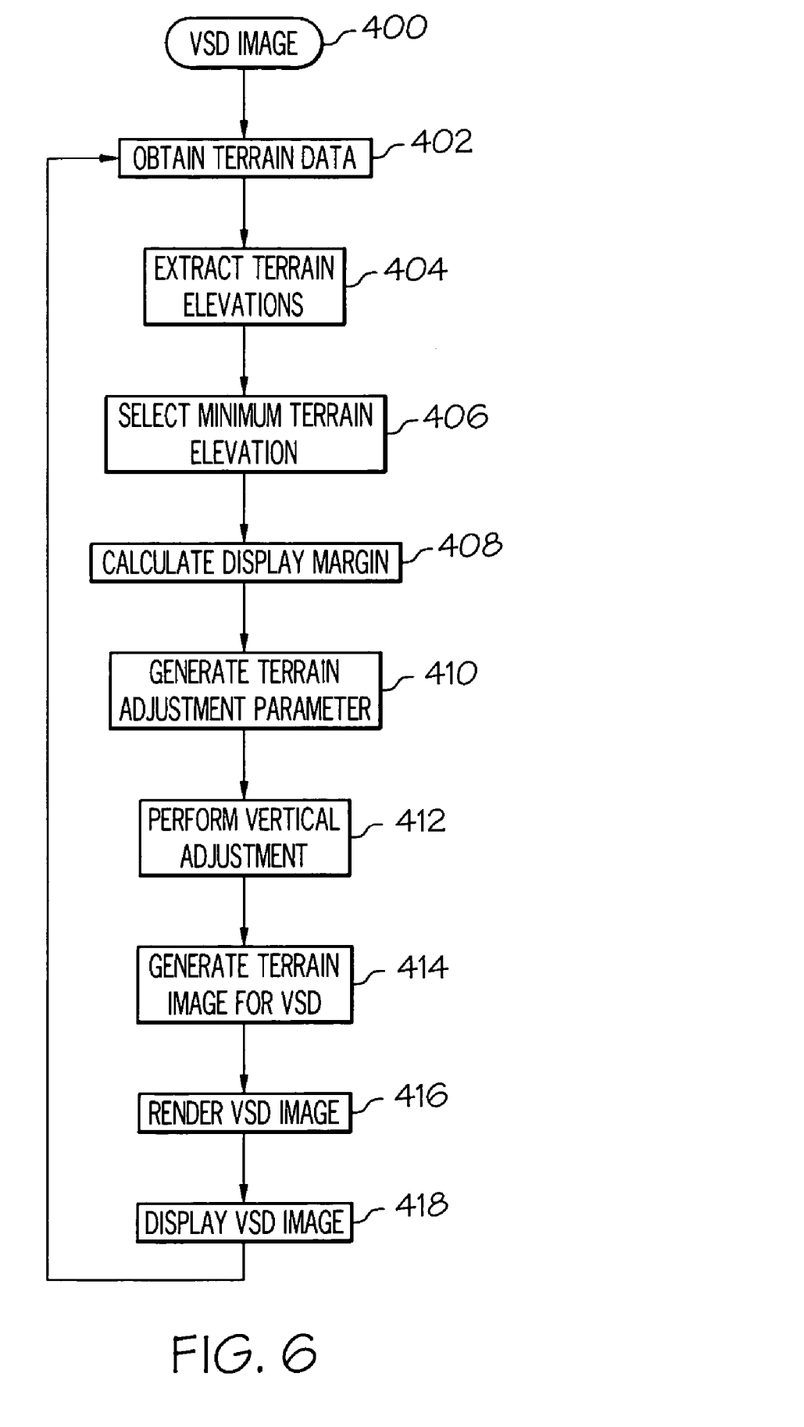
FIG. 6 is a flow diagram of a VSD process.

FIG. 6 is a flow diagram of a VSD process 400 that may be performed by a display system configured in accordance with the invention. Process 400 may be performed and/or controlled by one or more of the logic and/or processor elements described herein. In a practical implementation, process 400 may include any number of additional and/or alternative tasks, and process 400 may be incorporated into a more complex procedure related to the generation of a flight deck display or any avionics procedure. Furthermore, the tasks depicted in process 400 need not be performed in the order shown in FIG. 6 and one or more of the tasks may be performed concurrently in a practical embodiment.

VSD process 400 assumes that the aircraft is already in flight and that the various navigation and terrain-related systems described herein are operational and functioning as usual. VSD process 400 may begin by obtaining terrain data from the terrain database(s) for processing (task 402). As mentioned above, the terrain data preferably includes a plurality of terrain elevations corresponding to the terrain indicated by the lateral range of the VSD. The terrain data is processed in a suitable manner to extract the terrain elevations (task 404) and select the minimum terrain elevation from the extracted elevations (task 406). Notably, the minimum terrain elevation need not be the minimum elevation associated with the entire flight plan of the aircraft, but merely the "local" minimum for the current lateral or horizontal range of the VSD.

VSD process 400 may calculate a display margin for the terrain image to be displayed (task 408) using any suitable technique or algorithm. In the preferred embodiment, the display margin is based upon the vertical scale of the VSD. In particular, the display margin is calculated as a percentage (e.g., 10%) of the vertical scale of the VSD. VSD process 400 may also generate a terrain adjustment parameter (task 410) related to a minimum terrain elevation within the current VSD range. In one embodiment, the display margin and the minimum terrain elevation selected during task 406 are processed to generate the terrain adjustment parameter. An example terrain adjustment parameter, Terrain_Alt, and its derivation are described in detail above. Notably, tasks 408 and 410 may be performed in any order or concurrently in various practical embodiments.

VSD process 400 performs a vertical adjustment procedure (task 412) to adjust the terrain image within the VSD. The vertical adjustment may be responsive to the terrain adjustment parameter, and the vertical adjustment algorithm biases the terrain image toward the lower elevation region of the VSD. VSD process 400 generates a terrain image for the VSD (task 414), where the terrain image is representative of the terrain data obtained during task 402. As shown in FIG. 4, the terrain data may be a continuous image across the lateral range of the VSD that represents a two-dimensional profile view of the terrain elevation relative to the position of the aircraft and/or the flight plan.

Once the VSD has been properly oriented, the display system can render the VSD image (task 416) and display the VSD image on the display device (task 418). In practice, VSD process 400 is an ongoing process that updates the VSD image in real time to reflect the movement of the aircraft and to reflect the changes in the terrain under the aircraft. Accordingly, VSD process 400 is depicted as being re-entered at task 402.

While at least one example embodiment has been presented in the foregoing detailed description, it should be appreciated that a vast number of variations exist. It should also be appreciated that the example embodiment is not intended to limit the scope, applicability, or configuration of the invention in any way. Rather, the foregoing detailed description will provide those skilled in the art with a convenient road map for implementing the example embodiment. It should be understood that various changes can be made in the function and arrangement of elements without departing from the scope of the invention as set forth in the appended claims and the legal equivalents thereof.

What is claimed is:

1. A method for displaying terrain on an aircraft flight deck display system, said method comprising:
   processing terrain data, said terrain data including a plurality of obtained terrain elevations that correspond to a lateral range of a vertical situation display (VSD);
   generating a terrain adjustment parameter based on said plurality of terrain elevations; and
   displaying a terrain image representative of said terrain data on the VSD in response to said terrain adjustment parameter, said terrain image being biased toward a lower elevation region of said VSD.

2. A method according to claim 1, further comprising generating said terrain image as a continuous image across a lateral range of said VSD.

3. A method according to claim 1, wherein said generating step comprises selecting one of said plurality of terrain elevations.

4. A method according to claim 3, wherein said generating step comprises selecting a minimum terrain elevation from said plurality of terrain elevations.

5. A method according to claim 1, further comprising calculating a display margin for said terrain image, said display margin representing a minimum separation between said terrain image and a horizontal boundary of said VSD.

6. A method according to claim 5, wherein said calculating step calculates said display margin in response to a vertical scale of said VSD.

7. A method according to claim 6, wherein said calculating step calculates said display margin as a percentage of said vertical scale.

8. A flight deck display system for an aircraft, said flight deck display system comprising:
   a processor configured to receive terrain data and, in response to said terrain data, to generate one or more image rendering display commands; and
   a display device configured to receive rendering data indicative of said image rendering display commands and, in response to said rendering data, to render a terrain image representative of said terrain data on a vertical situation display ("VSD"), said terrain image being biased toward a lower elevation region of said VSD,
   wherein said terrain data includes a plurality of terrain elevations corresponding to a lateral range of said VSD, and wherein:
   said processor is further configured to generate a terrain adjustment parameter based upon said plurality of terrain elevations; and
   said display device renders said terrain image in response to said terrain adjustment parameter.

9. A system according to claim 8, wherein said display device renders said terrain image as a continaous image across a lateral range of said VSD.

10. A system according to claim 8, wherein said terrain adjustment parameter is based upon a minimum terrain elevation from said plurality of terrain elevations.

11. A system according to claim 8, wherein said processor is further configured to calculate a display margin for said terrain image, said display margin representing a minimum separation between said terrain image and a horizontal boundary of said VSD.

12. A system according to claim 11, wherein said processor calculates said display margin in response to a vertical scale of said VSD.

13. A system according to claim 12, wherein said processor calculates said display margin as a percentage of said vertical scale.

14. A method for displaying terrain on a vertical situation display ("VSD") having a lateral range, said method comprising:
   obtaining terrain data corresponding to said lateral range of said VSD, said terrain data including a plurality of terrain elevations;
   selecting a minimum terrain elevation from said plurality of terrain elevations;
   generating a terrain image representative of said terrain data; and
   vertically adjusting said terrain image, in response to said minimum terrain elevation, for rendering on said VSD.

15. A method according to claim 14, wherein said generating step generates said terrain image as a continuous image across said lateral range of said VSD.

16. A method according to claim 14, wherein said vertically adjusting step adjusts said terrain image to be biased toward a lower elevation region of said VSD.

17. A method according to claim 14, further comprising generating a terrain adjustment parameter based upon said minimum terrain elevation, said vertically adjusting step being responsive to said terrain adjustment parameter.

18. A method according to claim 17, wherein said terrain adjustment parameter is further based upon a display margin for said terrain image, said display margin representing a minimum separation between said terrain image and a horizontal boundary of said VSD.

19. A method according to claim 18, further comprising calculating said display margin in response to a vertical scale of said VSD.

20. A method according to claim 19, wherein said calculating step calculates said display margin as a percentage of said vertical scale.

21. A flight deck display system for an aircraft, said flight deck display system comprising:
processing logic for processing terrain data;
means for displaying a terrain image representative of said terrain data on a vertical situation display ("VSD"), said terrain image being biased toward a lower elevation region of said VSD; and
means for generating a terrain adjustment parameter in response to a minimum terrain elevation within a lateral range of said VSD, said means for displaying being responsive to said terrain adjustment parameter.

22. A system according to claim 21, wherein said means for displaying displays said terrain image as a continuous image across a lateral range of said VSD).

23. A system according to claim 21, further comprising means for generating a terrain adjustment parameter in response to a display margin for said VSD, said means for displaying being responsive to said terrain adjustment parameter.

24. A system according to claim 23, wherein said display margin represents a minimum separation between said terrain image and a horizontal boundary of said VSD.

\* \* \* \* \*